Aug. 15, 1933. P. ECKERT 1,922,937
EXTRUSION MOLDING PRESS
Filed Oct. 2, 1930   6 Sheets-Sheet 6
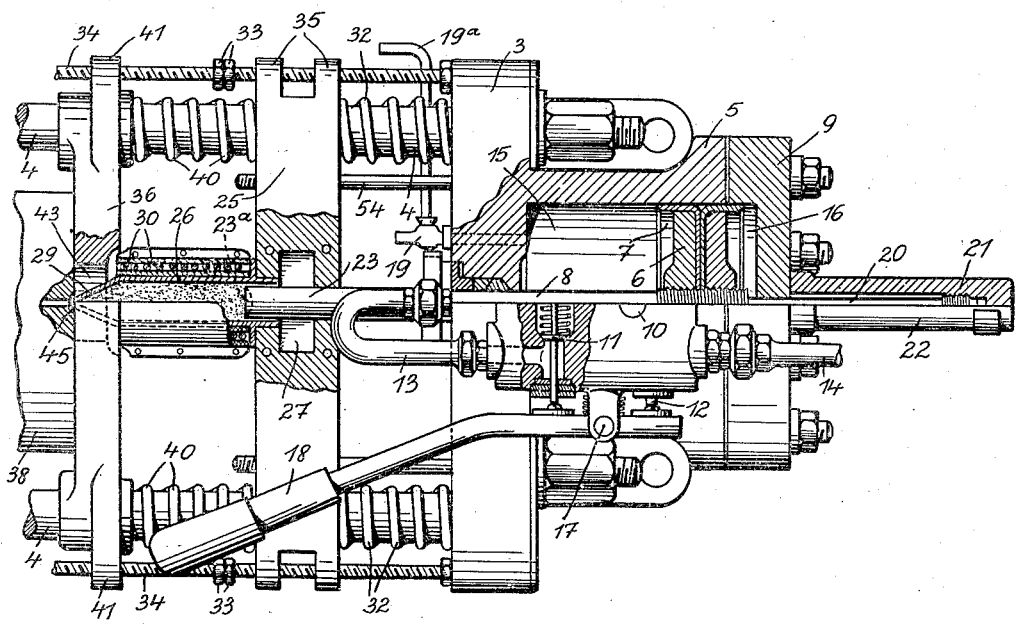
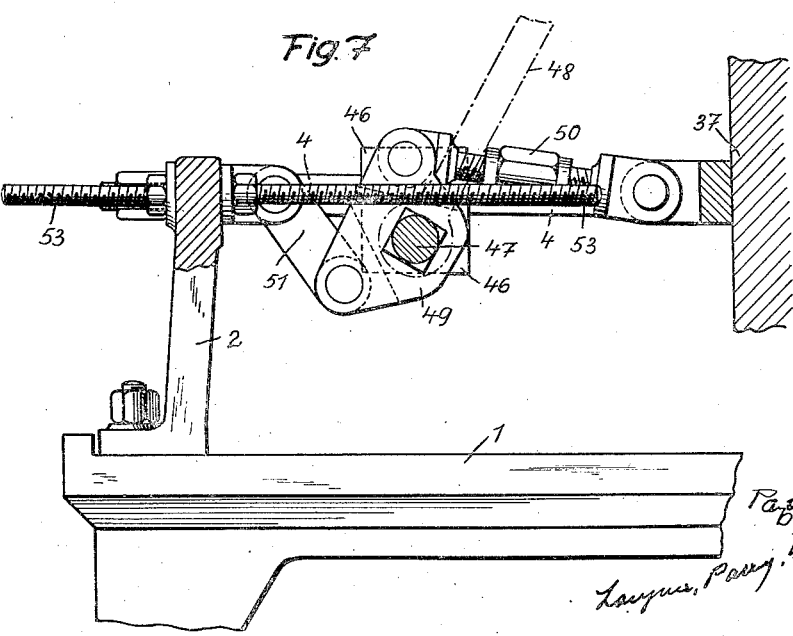
Inventor:
Paul Eckert
By:
Attorneys.

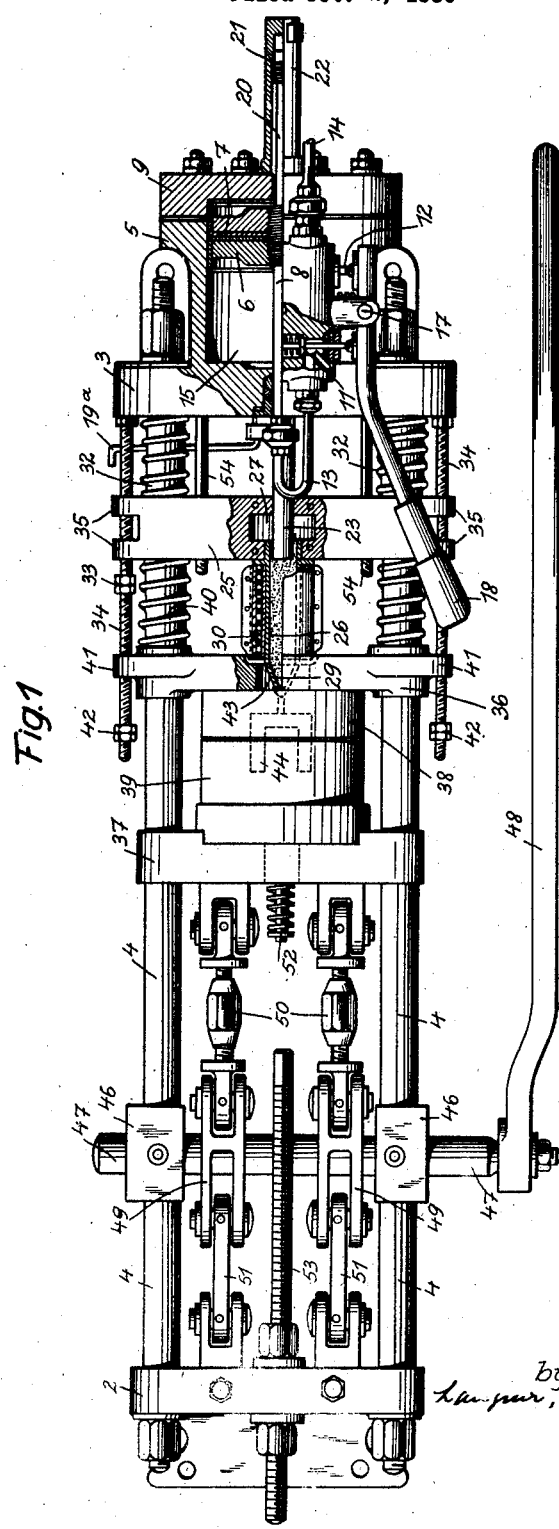

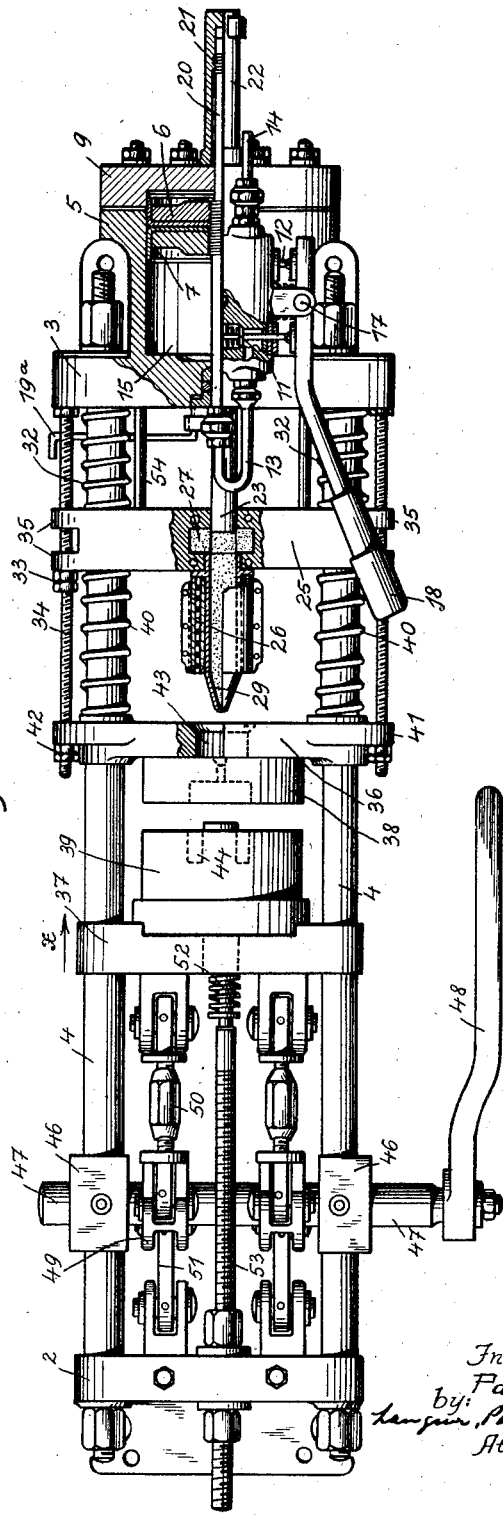

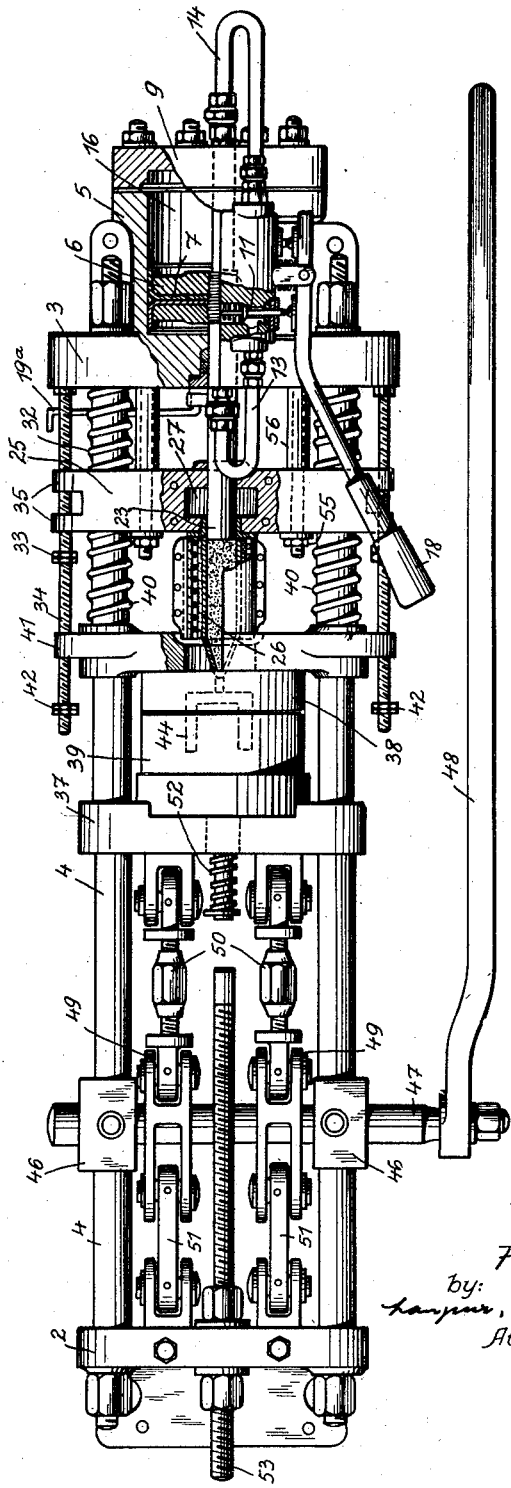

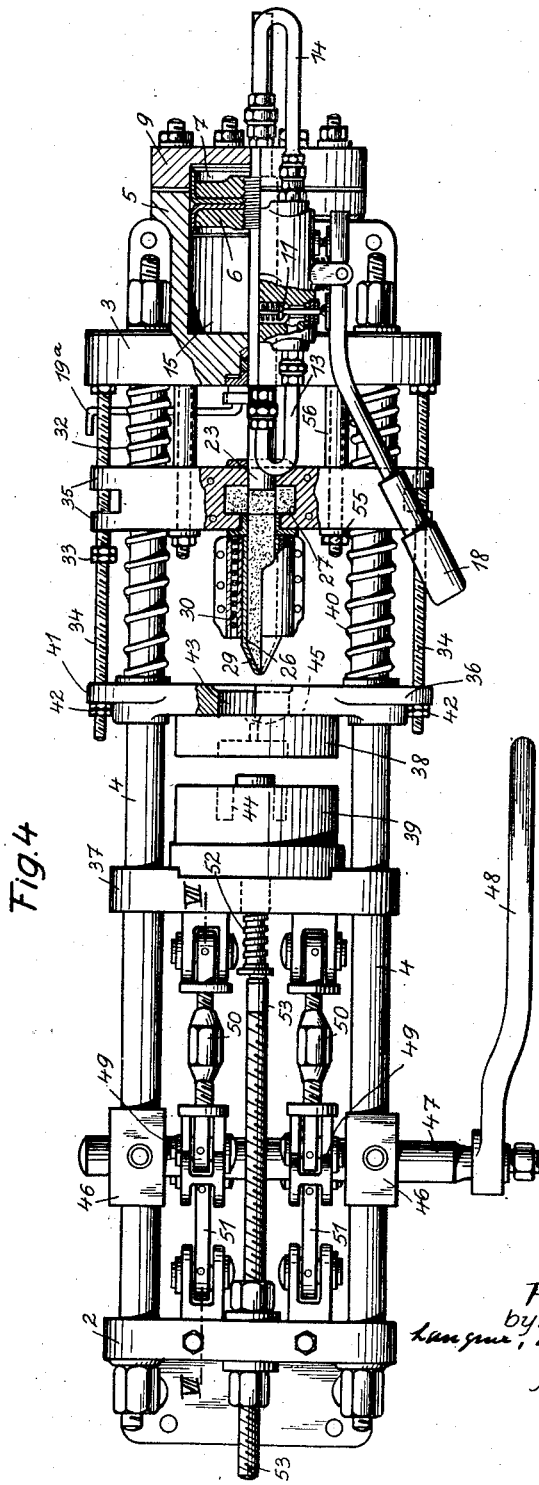

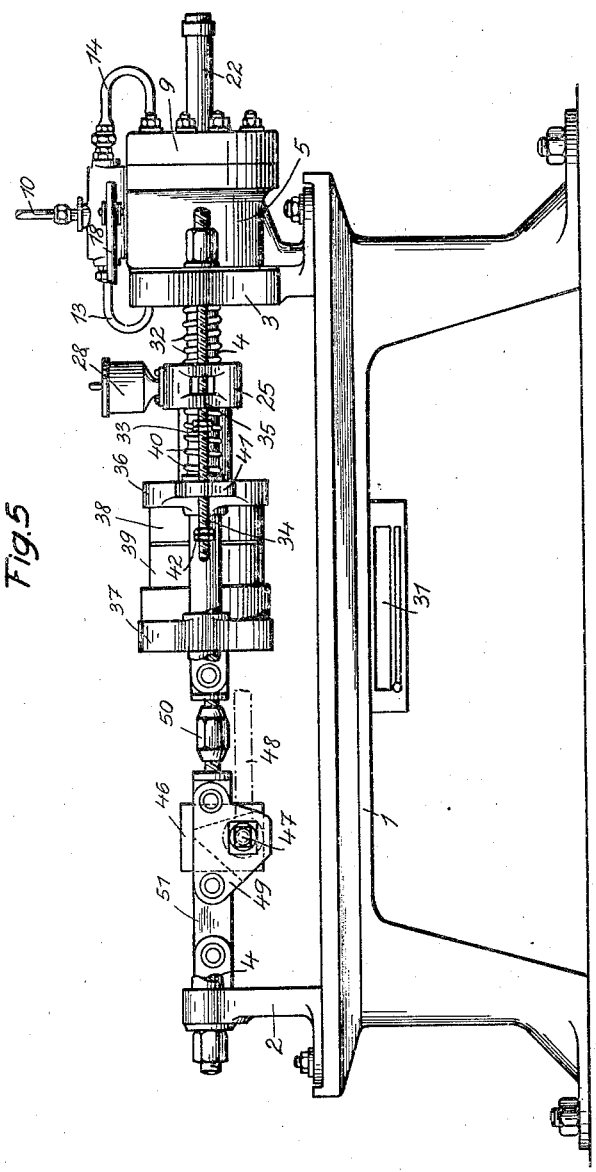

Patented Aug. 15, 1933

1,922,937

UNITED STATES PATENT OFFICE 1,922,937

EXTRUSION MOLDING PRESS

Paul Eckert, Cologne, Germany, assignor to Eckert & Ziegler G. m. b. H., of Cologne-Braunsfeld, Germany, a Corporation of Germany Application October 2, 1930, Serial No. 486,002, and in Germany April 15, 1930

9 Claims. (Cl. 18—16)

My invention relates to extrusion molding presses in which the material to be molded, which may be, for instance, the waste from the manufacture of artificial silk known as "Trolit", or any other thermoplastic material, is forced into a mold at high pressure by a ram.

It is an object of my invention to increase the adaptability of a press of this type.

To this end I so design the press that it may be operated by hand or by a pressure fluid, by providing means for alternately fixing the cylinder of the press with respect to its ram, or the ram with respect to its cylinder.

Extrusion presses of this type as designed heretofore are either for hand operation only, pressure being exerted by means of a hand operated toggle lever arrangement or the like, or the ram is moved by compressed air. The first type is limited in its range of application as the pressure exerted by hand is only sufficient for the production of relatively small articles, while the second type is dependent upon the presence of a source of compressed air.

The adaptability of the extrusion molding press is substantially increased according to my invention in that it may be operated selectively by compressed air, or some other fluid under pressure, or by hand. The cylinder and the mold are preferably fixed and the ram is movable when operating with compressed air and the ram being fixed and the cylinder and mold movable when the press is operated by hand. My press is of greater capacity than a hand press as it is designed for compressed air, while on the other hand it is not inoperative when the supply of compressed air fails.

A preferred construction of my press is illustrated by way of example in the accompanying drawings, in which Figs. 1 and 2 are partly sectional plan views showing the press arranged for hand operation, in two different working positions;

Figs. 3 and 4 are partly sectional plan views showing the same working positions for operation by compressed air;

Fig. 5 is an elevation of the press;

Fig. 6 illustrates on a larger scale and partly in section the compressed air cylinder and the extrusion cylinder and ram, and Fig. 7 shows the toggle lever arrangement on a larger scale and in section on the line VII—VII, Fig. 4.

On the frame 1 of the press, Fig. 5, are fixed two bearing brackets 2 and 3 which are connected together by two tie rods 4. The bearing bracket 3 carries a power cylinder 5 in which is a double-acting piston 6, Fig. 6, provided with cup leathers 7, the piston rod 8 of which projects on the one side through the cylinder cover 9 and on the other side through the bearing bracket 3 forming the cylinder bottom.

The piston 6 is movable in the cylinder 5 by any suitable fluid, such as compressed air. For this purpose a supply pipe 10 is provided for the compressed air received for example from a compressor plant, not shown, which can be placed in communication with the spaces 15 and 16 of the cylinder 5 by valves 11, 12 and pipes 13, 14. According to whether the valve 11 or the valve 12 is opened by means of the actuating lever 18, which rocks about the pivot 17, the piston 6 moves under the influence of the compressed air either to its outer position as shown in Fig. 6 or to its inner position as shown in Fig. 3.

In order to accomplish a percussive movement of the piston 6 from the position according to Fig. 6 to that according to Fig. 3 the cylinder space 15 is connected with the atmosphere by a pipe 19a, in which is a valve 19, for discharging rapidly the air in front of the piston, when compressed air is admitted to the space 16.

The tail end 20 of the piston rod 8 projecting through the cylinder cover 9 is screw-threaded at 21 to receive a cap nut 22 when the machine is arranged for hand operation. The cap nut 22 abuts against the cylinder cover 9 and holds the piston 6 with the piston rod 8 rigidly fixed in its outer end position.

The end 23 of the piston rod 8 which extends through the bearing bracket 3 serves as the extrusion ram and projects through a space 27 of a cross member 25 slidable on the two tie rods 4. On the cross member 25 is fixed a cylinder 26 for the material to be molded, the internal diameter of which is substantially equal to the diameter of the ram 23. A hopper 28, Fig. 5, for the material to be extruded is connected to the space 27.

The cylinder 26 terminates in a conical nozzle 29 and is surrounded by the windings 30 of an electric heating resistance which is regulated by an adjustable series resistance 31 (Fig. 5). The number of windings of the resistance 30 increases from the outer end of the cylinder 26 towards its nozzle 29, so that the temperature of the thermoplastic material in the cylinder 26 increases towards the nozzle 29.

Between the cross member 25 and the fixed bearing bracket 3 springs 32 are arranged on the tie rods 4 which tend to move the cross member 25 away from the bearing bracket 3. On the tie rods 4 two further cross members 36 and 37 are mounted which carry the two parts 38, 39 of the mold, Figs. 1 to 4. The cross member 36 is under the influence of springs 40 which, like the springs 32, are arranged on the tie rods 4 and abut against the cross member 25 and has projections 41 which engage screw-threaded bolts 34 and in the final position illustrated in Fig. 2 abut against stop nuts 42 arranged on the bolts 34.

The cross member 36 is cut away centrally at 43. The nozzle 29 is adapted to enter the cut-away central portion of the member, its free end fitting tightly a bore 45 in the mold part 38 communicating with the cavity 44 of the mold.

The cross member 37 is displaced on the tie rods 4 by means of a toggle lever arrangement which will now be described with reference to Fig. 7. Two blocks 46, sliding on the tie rods 4, carry a shaft 47 arranged transversely to the tie rods 4, which can be turned by means of a lever 48. Two cranks 49 are fixed on the shaft 47 between the tie rods 4, which are connected, by means of links 50 and 51 with the cross member 37 and with the bearing bracket 2. The length of the links 50 is adjustable since they consist of two screw-threaded bolts connected together by a nut.

An ejector 52 is provided for the part 39 of the mold. This ejector after completion of each extrusion operation is operated by means of a rod 53 adjustable in the bearing bracket 2 and thus removes the finished article from the mold cavity 44.

Stay bolts 54 on the bearing bracket 3 project through bores in the cross member 25 and are screw-threaded at their outer ends for the reception of nuts 55 (Fig. 3). During the compressed-air operation distance sleeves 56 (Fig. 3) are placed on the stay bolts 54 between the bearing bracket 3 and the cross member 25. When the press is arranged for hand operation the springs 32 forces the cross member 25, after the molding operation, against stop nuts 33 which are adjustably mounted on the screw-threaded bolts 34.

The operation of the press is as follows:

For operation by hand the piston 6 is fixed in the final position shown in Figs. 1 and 6 by screwing the cap nut 22 on the thread at the tail end of the piston rod 2. The nuts 55 and the distance sleeves 56 are removed from the stay bolts 54 so that the cross member 25 is free to move.

After the material has been placed in the hopper 28 and the heating of the cylinder 26 has been started the extrusion can begin. By means of the hand lever 48 and the toggle lever arrangement 49 to 51 the cross member 37 is moved in the direction of the arrow X shown in Figure 2, carrying with it the part 39 of the mold. When this part of the mold is engaged with the other part 38, so that the mold cavity 44 is closed, the cross member 36 is entrained against the pressure of the springs 40, and the nozzle 29 of the cylinder 26 comes into airtight contact with the bore 45 of the mold part 38. As the hand lever 48 is turned further the cylinder 26 is pushed over the fixed ram 23 and the material, which has become plastic by the heating of the cylinder, is extruded into the mold cavity through the bore 45.

The pressure exerted by the toggle lever mechanism described is sufficient for smaller castings. For larger ones the machine is operated by compressed air or other fluid under pressure.

When the lever 48 is returned to its initial position, the cross members 25 and 36 return under the influence of the springs 32 and 40 in the opposite direction to the arrow X until they abut against the stop nuts 33 and 42. The cylinder 26 returns to its outer final position, Figure 2, a partial vacuum being set up in the cylinder which assists the introduction of the material required for the next operation.

As Figure 1 particularly shows, the dimensions of the various parts as well as the stroke of the chamber 26 or the ram 23 are chosen in such a way that the ram 23 never enters a hot portion of the cylinder 26. The material with which the ram is in contact, is still pulverulent and not plastic, and therefore does not stick to the ram.

Instead of a resistance coil 30 for heating the cylinder 26, I may provide other heating means, for instance, gas burners, not shown, the number of which increases towards the nozzle 29.

The end 23a of the ram 23 (Figure 6) which acts on the pulverulent material is made concave, preferably spherical, as the pressure of the ram at all points of its end surface acts towards the axis of the chamber 26 and the tendency of the material to stick to the wall of the cylinder 26 is counteracted.

As appears from Figure 6, the space 27 for the supply of material to the cylinder 26 from hopper 28 is connected to the coolest portion of the cylinder. This likewise has the object of preventing the extrusion material from sticking to the ram 23. In the known machines which do not possess this arrangement of the space 27 softening of the material takes place in the space, choking the supply. Furthermore by the new arrangement burning of the extrusion material owing to too high or too long heating is avoided.

As will appear from Figure 2, the nozzle 29 of the cylinder 26 is automatically removed from the bore 45 of the mold part 38 after completion of the extrusion. Apart from a very effective cooling of the highly stressed nozzle 29, the gases which may form in the cylinder from the material, for example from acetic acid, escape into the atmosphere through the nozzle.

For operating with compressed air or gas, the cap nut 22 is removed from the tail end 20 of the piston rod 8 so that the piston 6 is free to move, the distance sleeves 56 are placed on the stay bolts 54 and the cross member 25 is pressed as far against the bearing bracket 3 by the nuts 55 as the distance sleeves 56 allow.

Now, as described, by turning the lever 48 the part 39 of the mold is pressed against the part 38 and the latter against the nozzle 29 of the chamber 26. In this position the hand lever 48 is held by suitable locking means, not shown, so that the various parts of the machine cannot return into their initial positions under the action of the high pressure. The lever 18 is now operated for admitting compressed air to the space 16 of the cylinder 26. As mentioned, the machine is operated with compressed air or other fluid for larger castings or for castings of complicated shape in which the pressure of the toggle lever mechanism is not sufficient for filling the mold cavity completely. Any pressure may be employed, 850 to 1700 lbs. per squ. in. being a suitable range.

In order to return the piston 6 and the ram 23 rapidly into initial position, the space 15 is put in communication with the atmosphere by opening the valve 19 of the pipe 19a. The return stroke of the ram 23 into the position shown in Figure 4 is effected by introducing compressed air into the cylinder chamber 15 after the valve 19 has been closed.

After completion of the extrusion the mold is separated from the chamber 26 and the mold parts 38 and 39 are separated from each other by means of the toggle lever arrangement 49 to 51 as described.

The lever 18 opens either the valve 12 for the pipe 14 or the valve 11 for the pipe 13.

All the advantages of the new construction specified in the explanation of the hand operation are also obtainable to the same degree with compressed air operation; in particular, however, the new press has the great advantage that it is equally suitable for hand and compressed air operation.

I claim:

1. An extrusion press for molding thermoplastic substances comprising an extrusion cylinder, a nozzle at one end of said extrusion cylinder, a mold adapted to receive the material from said nozzle, a ram in said extrusion cylinder, a power cylinder, a piston in said power cylinder operatively connected to said ram, means for supplying operating fluid alternately to opposite sides of said piston, a tail rod on said piston extending through one of the covers of said power cylinder, a sleeve adapted to be secured on said tail rod and to abut against said cover so as to hold said piston and said ram in a fixed position with respect to said power cylinder, and manually operated means for displacing said mold with respect to said ram.

2. A horizontal spray casting machine for molding thermoplastic substances comprising an extrusion cylinder, means for displacing said cylinder, a nozzle at one end of said extrusion cylinder, a mold adapted to receive the material from said nozzle, a ram in said extrusion cylinder, means for displacing said ram, means for temporarily holding said extrusion cylinder stationary, means for temporarily holding said ram stationary, and means for operating each displaceable member with respect to the temporarily stationary one.

3. A horizontal spray casting machine for molding thermoplastic substances comprising an extrusion cylinder, means for displacing said cylinder, a nozzle at one end of said extrusion cylinder, a mold adapted to receive the material from said nozzle, a ram in said extrusion cylinder, means for displacing said ram, means for temporarily holding said extrusion cylinder stationary, means for temporarily holding said ram stationary, and manually operated means including a toggle-lever system for displacing the displaceable member with respect to each temporarily stationary one.

4. A horizontal spray casting machine for molding thermoplastic substances comprising an extrusion cylinder, means for displacing said cylinder, a nozzle at one end of said extrusion cylinder, means for heating said extrusion cylinder to a temperature which is a maximum at said nozzle, a mold adapted to receive the material from said nozzle, a ram in said extrusion cylinder, means for displacing said ram, means for temporarily holding said extrusion cylinder stationary, means for temporarily holding said ram stationary, and means for operating each displaceable member with respect to the temporarily stationary one.

5. A horizontal spray casting machine for molding thermoplastic substances comprising an extrusion cylinder, means for displacing said cylinder, a nozzle at one end of said extrusion cylinder, a mold adapted to receive the material from said nozzle, a ram in said extrusion cylinder, means for displacing said ram, means for temporarily holding said extrusion cylinder stationary, means for temporarily holding said ram stationary, means for heating said extrusion cylinder, means for displacing each displaceable member with respect to the temporarily stationary one, and means controlling the relative displacement of said members so that the said ram will only enter partly said extrusion cylinder at the end opposite said nozzle.

6. A horizontal spray casting machine for molding thermoplastic substances comprising an extrusion cylinder, a nozzle at one end of said extrusion cylinder, a mold adapted to receive the material from said nozzle, a ram in said extrusion cylinder, a power cylinder, a piston in said power cylinder operatively connected to said ram, means for supplying operating fluid alternately to opposite sides of said piston, means for holding said piston stationary with respect to said power cylinder, and manually operated means for displacing said mold with respect to said ram.

7. A horizontal spray casting machine for molding thermoplastic substances comprising an extrusion cylinder, means for reciprocating said cylinder, a nozzle at one end of said extrusion cylinder, a mold formed of two parts, one of said parts being adapted to receive said nozzle, a ram in said extrusion cylinder, means for reciprocating said ram, means for temporarily holding said extrusion cylinder stationary, means for temporarily holding said ram stationary, means for displacing each movable member with respect to the temporarily stationary one and for moving said mold parts into and out of engagement with each other, said means being so designed as to first withdraw said nozzle from the mold part receiving the same and then to separate the parts of the mold.

8. A horizontal spray casting machine for molding thermoplastic substances comprising an extrusion cylinder, means for reciprocating said extrusion cylinder, a nozzle at one end of said extrusion cylinder, a mold adapted to receive the material from said nozzle, a ram in said extrusion cylinder, means for reciprocating said ram, a movable part upon which said extrusion cylinder is fixed, a power cylinder, means for holding said movable part temporarily stationary, a piston in said power cylinder operatively connected to said ram, means for supplying operating fluid alternately to opposite sides of said piston, means for holding said piston stationary relative to said power cylinder, and manually operated means for displacing said mold with respect to said ram.

9. A horizontal spray casting machine for molding thermoplastic substances comprising an extrusion cylinder slidingly mounted, a nozzle at one end of said extrusion cylinder, a mold adapted to receive the material from said nozzle, a ram slidingly mounted having one end extending into said extrusion cylinder, said end of said ram being concave, means for holding temporarily said extrusion cylinder stationary, means for holding temporarily said ram stationary, and means for displacing each movable member with respect to the temporarily stationary one.

PAUL ECKERT.